May 9, 1961 — S. C. HETH — 2,983,093
REEL TYPE LAWN MOWER WITH AIR BAFFLE
Filed Oct. 2, 1959

INVENTOR:
SHERMAN C. HETH
BY: *Arthur J. Hansmann*
ATTORNEY

United States Patent Office 2,983,093
Patented May 9, 1961

2,983,093

REEL TYPE LAWN MOWER WITH AIR BAFFLE

Sherman C. Heth, Racine, Wis., assignor to Jacobsen Manufacturing Company, Racine, Wis., a corporation of Wisconsin Filed Oct. 2, 1959, Ser. No. 844,117

4 Claims. (Cl. 56—26)

This invention relates to reel type lawn mowers.

It is an object of this invention to provide an improved reel type of lawn mower and specifically it is an object of this invention to provide a reel type lawn mower which will create a flow of air immediately in advance of the mower bed or shear plate to cause the grass to be mowed to be lifted or stood erect by the flow of air.

Another object of this invention is to accomplish the foregoing object of suction lifting the grass without requiring expensive and complicated means such as added blowers or fans and blower housings or shrouding for the purpose of creating the flow of air mentioned.

Still another object of this invention is to provide a means which will accomplish the object of suction lifting the grass, with the means being applicable to existing mowers so that they can be readily converted or modified to incorporate the means responsible for the suction lifting.

Other objects and advantages will become apparent upon reading the following description in conjunction with the accompanying drawings, wherein.

The same reference numerals refer to the same parts between the two views.

Figure 1:
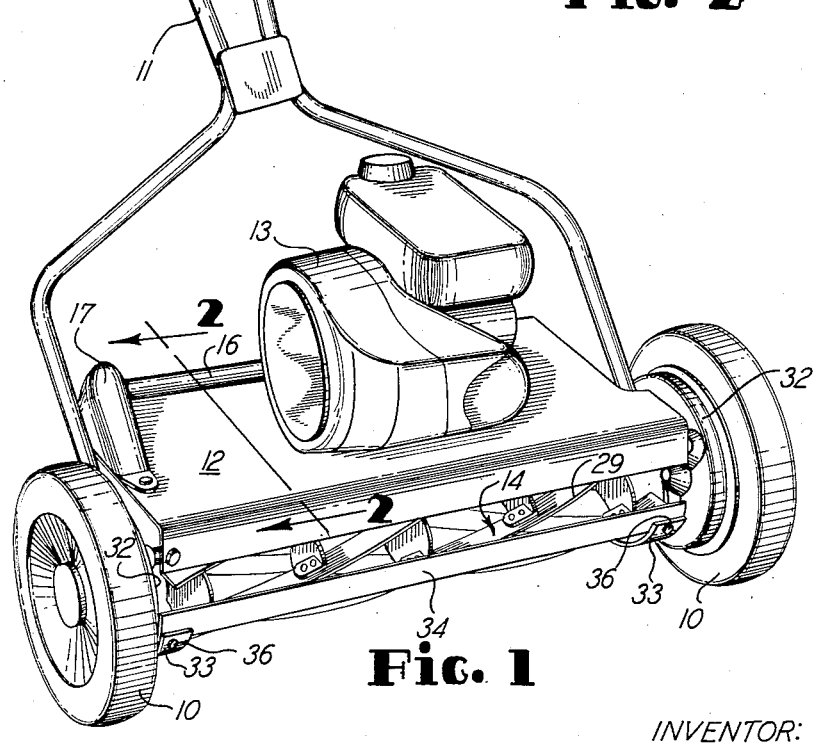
Fig. 1 is a front perspective view of a mower incorporating a preferred embodiment of this invention.

Fig. 1 shows generally a conventional type of lawn mower of the reel type and which is powered. Thus, ground wheels 10 are employed to mobiley support the usual mower handle 11, upper deck 12, engine or prime mover 13 and the usual mower reel 14. It will be further understood that the engine 13 operates the jack shaft 16 which extends to the housing 17 wherein a sprocket 18 is located. A drive chain 19 is engaged with the sprocket 18 and with a larger sprocket 21 attached to the reel 14 by means of the reel shaft 22. Still further, the usual roller 23 is rotatably mounted at the rear of the mower with the usual vertical adjustment means 24, and also the usual shear or bed plate 26 is stationarily attached in the position shown in Fig. 2. It will be still further noted that the stationary deck 12 is secured at the front by means of an arm 27 and it is secured at the rear by means of the outstanding eye bolt 28. Also the mower reel 14 has the usual cutter blades 29 incorporated therein so that the blades rotate with the rotation of the reel 14 by means of the drive from the engine as described, and the blades 29 rotate over the shear plate 26 to mow the grass indicated on the ground line G.

All of the foregoing is of a very common and conventional type of powered lawn mower of the reel type wherein the reel is driven by a prime mover 13 and it is thus rotated at a relatively high rate of speed. Beyond this conventional construction, the part of the mower which relates directly to the improvement herein are the hubs 32 located at the interior of the wheels 10, and it will be understood that these hubs are stationary to form a part of the frame of the mower including the stationary plate 33 which extends along a portion of the hubs 32 as shown. These parts are thus also well known to one skilled in the art of lawn mowers, and thus their construction and function will be fully understood.

Figure 2:
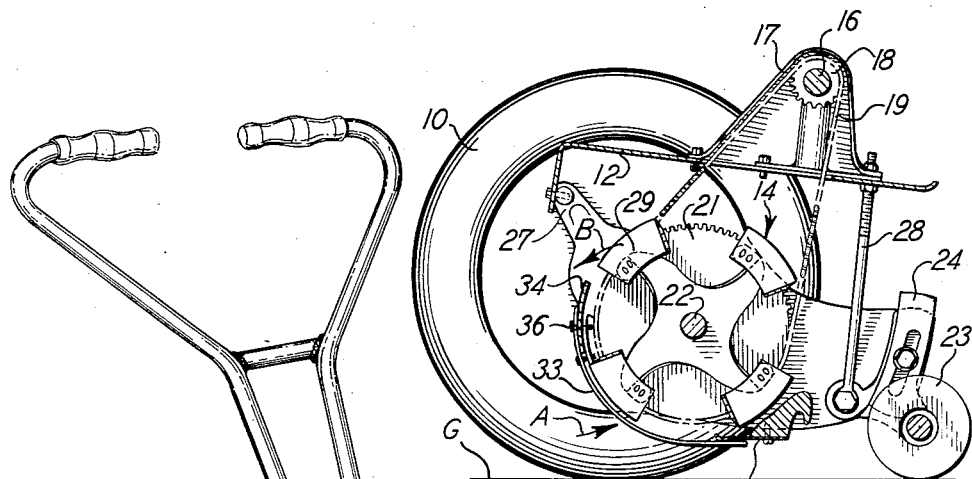
Fig. 2 is an enlarged sectional view taken along the lines 2—2 of Fig. 1.

The particular structural improvement of this invention is the provision of the baffle plate 34 which is shown to be secured to the plates 33 by means of bolts 36, and which is shown to extend across the length of the reel 14 and directly in front of and on level with the reel shaft 22. The plate 34 is thus an air baffle plate and it is preferably arcuately disposed as best shown in Fig. 2 to be within a very slight clearance from the circumference of the reel blade 29 and to be of a thin gauge material, such as sheet metal or plate. In actuality, the plate 34 is thus approximately two or three inches high to be spaced from the deck 12 at the upper edge of the plate 34 and to be also spaced from the shear plate 26 at the lower edge of the plate 34.

With this particular arrangement, it has been found that the reel 14 will create a flow of air into the reel in the direction of the arrow marked "A" and it will create an exhaust flow of air out of the reel into the direction of the arrow marked "B." Thus the plate 34 restricts the flow of air at the front of the reel 14 to cause the updraft in the direction of the arrow "A" to thereby lift the uncut blades of grass upwardly and into the reel so that the grass can be mowed at its full upstanding height, and the plate 34 also causes the air to exhaust at the upper end of the reel as indicated by the arrow "B" so that the exhaust does not interfere with the updraft as indicated by arrow "A." It has also been found that the plate 34 improves the directing of clippings into front mounted catchers of the conventional types. In this arrangement, the location of the plate 34 with the circumference of the reel 14 has been found to preferably be in the nature of providing a clearance of approximately .030 inch between reel and plate.

This relatively simple and inexpensive baffle plate 34 is related to the reel 14, the desirable effect of suction lifting the uncut blades of grass is achieved without undue complication in material and expense in that no blowers or additional fans and their housings are required like those that have been proposed in certain prior patents.

While a specific embodiment of this invention has been shown and described, it should be obvious that certain changes could be made in the embodiment and the invention should, therefore be limited only by the scope of the appended claims.

What is claimed is:

1. A reel type lawn mower comprising a reel rotatably mounted and having a plurality of grass cutting blades spaced around the circumference of said reel and including radially outwardly disposed cutting edges, a shear plate mounted adjacent said blades and across the bottom of said reel, and an air baffle mounted immediately adjacent said cutting edges of said blades and across the front of said reel and spaced from said shear plate for the entrance of air and grass into said reel in the space between said plate and said baffle when the reel is rotated and the mower is moved in a forward direction.

2. In a reel type lawn mower of the type including spaced-apart ground wheels including hubs, and a reel with blades having cutting edges rotatably mounted on said hubs and disposed between said wheels, and a shear plate mounted on said hubs across the bottom of said reel at the circumference thereof, and a deck mounted on said hubs above said reel and being substantially spaced therefrom, and a prime mover mounted on said deck for rotating said reel, the invention characterized by a baffle plate mounted on said mower and extending across the length of said reel and immediately adjacent the revolving cutting edges of said blades and on a level with and in front of the axis of rotation thereof, and with said baffle plate being substantially spaced from both said shear plate and said deck for providing air passageways in the latter two spaces for air to flow into said reel through the space between said shear plate and said baffle plate and for air to flow out of said reel through the space between said deck and said baffle plate.

3. In a reel type lawn mower of the type including spaced-apart ground wheels including hubs, and a reel with blades having cutting edges rotatably mounted on said hubs and disposed between said wheels, and a shear plate mounted on said hubs across the bottom of said reel at the circumference thereof, and a deck mounted on said hubs above said reel and being substantially spaced therefrom, and a prime mover mounted on said deck for rotating said reel, the invention characterized by a baffle plate of thin stock mounted on said mower and extending across the length of said reel on a level with and in front of the axis of rotation thereof and being immediately adjacent the cutting edges during the rotation of said blades and being arcuate about the axis of said reel to conform to the circumference of said reel, and with said baffle plate being substantially spaced from both said shear plate and said deck for providing air passageways in the latter two spaces for air to flow into said reel through the space between said shear plate and said baffle plate and for air to flow out of said reel through the space between said deck and said baffle plate.

4. In a reel type lawn mower of the type including spaced-apart ground wheels including hubs, and a reel with blades having cutting edges rotatably mounted on said hubs and disposed between said wheels, and a shear plate mounted on said hubs across the bottom of said reel at the circumference thereof, and a deck mounted on said hubs above said reel and being substantially spaced therefrom, and a prime mover mounted on said deck for rotating said reel, the invention characterized by a baffle plate mounted on said mower and extending across the length of said reel and immediately adjacent the revolving cutting edges of said blades and on a level with and in front of the axis of rotation thereof and spaced from the path of rotation of said cutting edges of said blades a distance sufficient to present a minimum clearance therebetween and being arcuate about the axis of said reel to conform to the circumference of said reel, and with said baffle plate being of a height less than the diameter of said reel and being substantially spaced from both said shear plate and said deck for providing air passageways in the latter two spaces for air to flow into said reel through the space between said shear plate and said baffle plate and for air to flow out of said reel through the space between said deck and said baffle plate.

References Cited in the file of this patent
UNITED STATES PATENTS

| | | |
|---|---|---|
| 2,110,147 | Mable | Mar. 8, 1938 |
| 2,303,055 | Lardi | Nov. 24, 1942 |
| 2,586,738 | Sullivan | Feb. 19, 1952 |
| 2,604,747 | Bosh | July 29, 1952 |